UNITED STATES PATENT OFFICE.

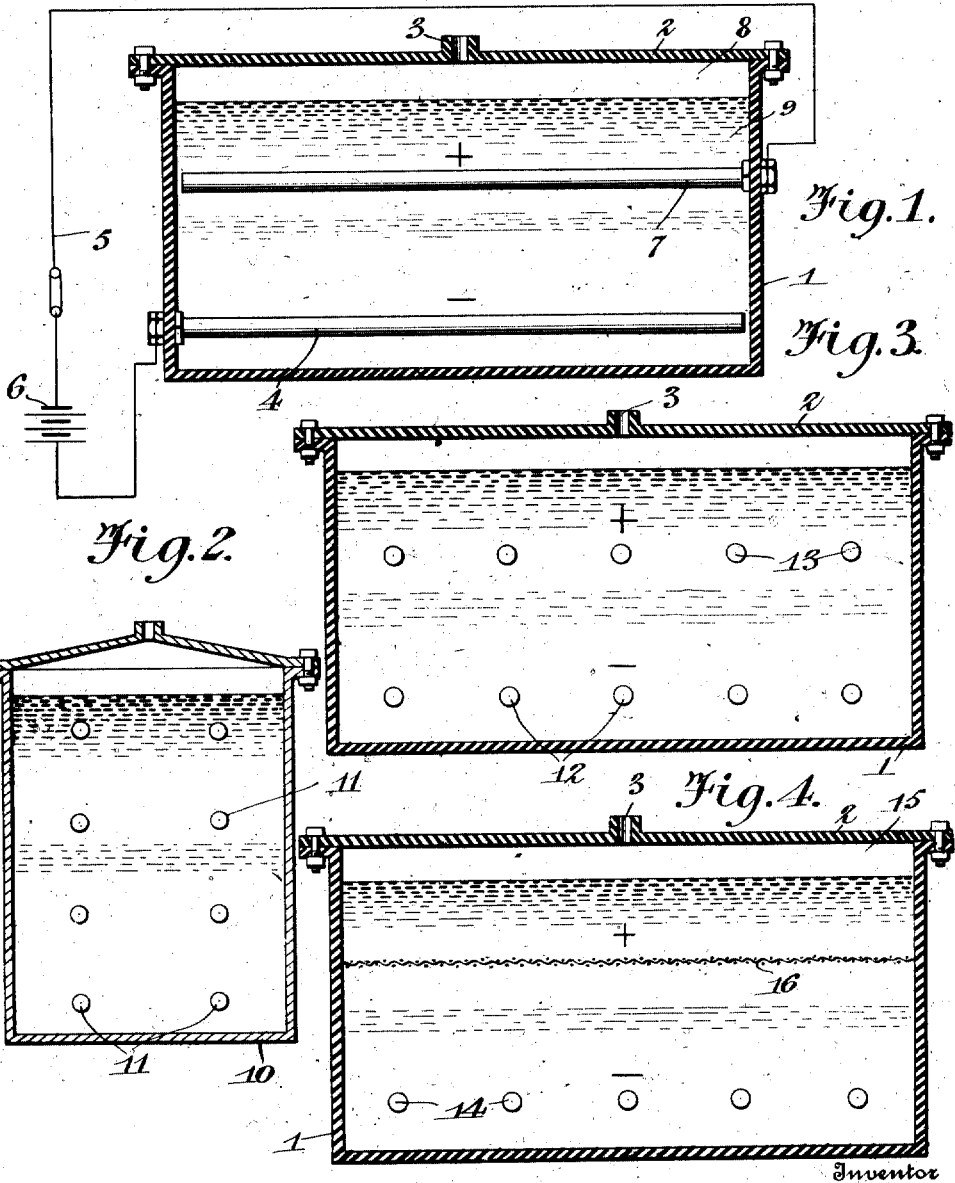

CLIDE F. EULER, OF TOPEKA, KANSAS.

GAS-GENERATOR.

1,234,319.  Specification of Letters Patent.  Patented July 24, 1917.

Application filed May 5, 1916. Serial No. 95,674.

*To all whom it may concern:*

Be it known that I, CLIDE F. EULER, a citizen of the United States, residing at Topeka, in the county of Shawnee and State of Kansas, have invented new and useful Improvements in Gas-Generators, of which the following is a specification.

This invention relates to a gas generator for converting a liquid into a gas or gases and it has for its primary object to accomplish this result with the minimum expenditure of energy.

An object of the invention is the novel manner of arranging the electrodes so that large areas of the liquid will be subjected to the action of an electric current and the gases generated partly mixed before leaving the liquid.

Besides the above my invention is distinguished in the manner of arranging a gas chamber relative to the electrodes and liquid so that the gas or gases arising will be thoroughly mixed before making their exit through a restricted outlet formed in the top wall of the tank.

With these and other objects in view, the invention will be better understood from the following detailed description taken in connection with the accompanying drawing, wherein Figure 1 is a sectional view of one form of my invention.

Fig. 2 is a sectional view of another form of my invention.

Figs. 3 and 4 are sectional views through other modifications of my invention.

Referring more particularly to Fig. 1 of the drawing, the numeral 1 designates the tank, the top 2 of which being formed with a centrally arranged outlet 3. Supported at the bottom portion of the tank which in this particular instance is of insulating material is a negative electrode 4 having a connection with one terminal of an electric circuit 5 including a source of current 6. Supported by the casing, a distance above the electrode 4 is a positive electrode 7 that connects to the remaining terminal of the circuit 5.

At this point I wish to call attention to the fact that the electrodes extend substantially the length of the tank so that a portion of the bubbles of gas ascending from the electrode 4 must encircle the electrode 7 before entering the gas chamber 8 arranged between the top surface of the liquid 9 within the tank and the top 2.

I have found out in practice that when water is used as the liquid, the hydrogen gas passing up from the electrode 4 passes around the electrodes 7 and is partly mixed with the oxygen before leaving the liquid, and the complete mixture of the gases is accomplished when passing into the chamber 8. In Fig. 2, I have illustrated the casing 10 of metal and connected to one terminal of the circuit, while the electrodes 11 are so arranged in the liquid as to lie parallel with, but spaced from the entire inner surface of the tank. The advantage of this latter arrangement is that large surfaces are presented for cutting down the resistance to the passage of the electric current and also to properly radiate the heat generated. In Fig. 3 I have illustrated an apparatus identical with Fig. 1 with the exception that a plurality of electrodes 12 forms a negative series while a similar number of electrodes 13 form the positive series. In Fig. 4 I have shown an arrangement whereby it will be impossible for any gas to pass from the lower electrodes 14 to the gas chamber 15 without commingling with the bubbles of gas generated at the electrode 16. To accomplish this action the electrode 16 is made of a foraminous material such as wire screen. Another advantage of this arrangement is that the bubbles of gas arising from the electrodes 14 will be brought close enough to the bubbles of gas arising from the electrode 16 as to have a mutual attraction for one another and thus a thorough mixing of the gases is accomplished.

From the foregoing description taken in connection with the accompanying drawing, it should be apparent that I provide an apparatus which is admirably adapted for the purpose for which it is intended, that the apparatus is simple, durable and efficient of construction, and that the apparatus may be manufactured and sold at a comparatively low cost and capable of generating gases in large quantities.

Having described my invention, what I claim is:—

1. A gas generator comprising a tank partly filled with a liquid, a negative electrode extending across the bottom of the said tank and having one end connected to the side wall of the tank whereby the electrode may be held out of engagement with the bottom wall of the tank, and a positive electrode arranged above said negative electrode and disposed below the upper surface of the liquid.

2. A gas generator comprising a tank partly filled with a liquid, a plurality of negative electrodes spaced apart horizontally across the tank and having the corresponding ends thereof secured to the adjacent wall of the tank whereby said electrodes may be held out of engagement with the bottom wall of the tank, and a plurality of positive electrodes spaced apart horizontally across the tank above said negative electrodes and having the corresponding ends thereof secured to the adjacent wall of the tank.

In testimony whereof I affix my signature.

CLIDE F. EULER.